(12) United States Patent
Kinouchi et al.

(10) Patent No.: US 11,853,097 B2
(45) Date of Patent: *Dec. 26, 2023

(54) ACCELERATOR PEDAL SYSTEM (71) Applicant: DENSO CORPORATION, Kariya (JP)

(72) Inventors: Soichi Kinouchi, Kariya (JP); Yuusuke Yoshida, Kariya (JP); Takuto Kita, Kariya (JP); Hideyuki Mori, Kariya (JP); Shinji Komatsu, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,883

(22) Filed: Aug. 23, 2022

(65) Prior Publication Data

US 2023/0067183 A1 Mar. 2, 2023

(30) Foreign Application Priority Data

Aug. 25, 2021 (JP) .................... 2021-137425

(51) Int. Cl.
*G05G 1/30* (2008.04)
*G05G 5/03* (2008.04)
(Continued)

(52) U.S. Cl.
CPC .............. *G05G 1/30* (2013.01); *B60K 26/021* (2013.01); *G05G 5/005* (2013.01); *G05G 5/03* (2013.01)

(58) Field of Classification Search
CPC ........... G05G 1/30; G05G 1/40; G05G 1/405; G05G 1/38; G05G 1/44; G05G 5/005;
(Continued)

(56) References Cited

U.S. PATENT DOCUMENTS 7,706,953 B1 * 4/2010 Sun ..................... B60W 30/143
340/441
2017/0217312 A1 * 8/2017 Schweinfurth ......... F02D 11/02
(Continued)

FOREIGN PATENT DOCUMENTS

| DE | 202008007799 U1 * | 12/2009 | ........... B60K 26/021 |
| EP | 2196348 A1 * | 6/2010 | ........... B60K 26/021 |
| JP | 2004-60484 | 2/2004 | |

OTHER PUBLICATIONS

Machine Translation of DE-202008007799-U1.*
(Continued)

*Primary Examiner* — Daniel D Yabut
*Assistant Examiner* — Brian J McGovern
(74) *Attorney, Agent, or Firm* — Nixon & Vanderhye P.C.

(57) ABSTRACT

An accelerator pedal system includes a pedal lever, a lock mechanism, an actuator, and an ECU. The pedal lever operates according to a step-on operation. The lock mechanism can restrict an operation of the pedal lever. The actuator switches between a locked state in which the operation of the pedal lever is restricted by the lock mechanism and an unlocked state in which the operation of the pedal lever is not restricted. The ECU includes an actuator control unit and a vehicle drive force control unit. The actuator control unit controls a drive of the actuator. When, during a travel of a vehicle in the locked state, (i) a disturbance is detected and (ii) the locked state is released, the vehicle drive control unit suppresses a vehicle drive force according to an opening degree of the pedal lever than a no disturbance situation.

8 Claims, 9 Drawing Sheets

(51) Int. Cl.
  *G05G 5/00* (2006.01)
  *B60K 26/02* (2006.01)
(58) Field of Classification Search
  CPC ... G05G 5/03; G05G 5/05; G05G 5/28; B60K 26/02; B60K 26/021; B60K 2026/023; B60K 2026/022; B60K 2026/026; B60K 28/02; B60W 2540/10; B60W 30/143; B60W 30/14; B60W 50/16
  See application file for complete search history.

(56) References Cited

U.S. PATENT DOCUMENTS

| | | | | |
|---|---|---|---|---|
| 2019/0322172 A1* | 10/2019 | O Meachair | ........ | B60W 30/143 |
| 2020/0019177 A1* | 1/2020 | Tatourian | ............. | G05D 1/0214 |
| 2021/0141411 A1* | 5/2021 | Kitagawa | ................ | B60T 8/409 |

OTHER PUBLICATIONS

Machine Translation of EP-2196348-A1.*
"Linear Actuator," Wikipedia Page, dated by Wayback Machine to Jun. 5, 2020, url:<https://web.archive.org/web/20200605003015/https://en.wikipedia.org/wiki/Linear_actuator> (Year: 2020).*
"Trapezoidal Thread Form," Wikipedia Page, dated by Wayback Machine to Mar. 31, 2019, url:<https://web.archive.org/web/20190331032652/https://en.wikipedia.org/wiki/Trapezoidal_thread_form> (Year: 2019).*
U.S. Appl. No. 17/893,618, filed Aug. 23, 2022, Accelerator Pedal System.
U.S. Appl. No. 17/893,637, filed Aug. 23, 2022, Accelerator Pedal System.
U.S. Appl. No. 17/893,668, filed Aug. 23, 2022, Accelerator Pedal System.
U.S. Appl. No. 17/893,700, filed Aug. 23, 2022, Accelerator Pedal System.
U.S. Appl. No. 17/893,752, filed Aug. 23, 2022, Accelerator Pedal System.
U.S. Appl. No. 17/893,801, filed Aug. 23, 2022, Accelerator Pedal System.
U.S. Appl. No. 17/893,842, filed Aug. 23, 2022, Accelerator Pedal System.
U.S. Appl. No. 17/893,883, filed Aug. 23, 2022, Accelerator Pedal System.
U.S. Appl. No. 17/893,618 to Yuusuke Yoshida, filed Aug. 23, 2022 (25 pages).
U.S. Appl. No. 17/893,668 to Yuusuke Yoshida, filed Aug. 23, 2022 (22 pages).
U.S. Appl. No. 17/893,637 to Yuusuke Yoshida, filed Aug. 23, 2022 (34 pages).
U.S. Appl. No. 17/893,700 to Soichi Kinouchi, filed Aug. 23, 2022 (24 pages).
U.S. Appl. No. 17/893,752 to Soichi Kinouchi, filed Aug. 23, 2022 (22 pages).
U.S. Appl. No. 17/893,842 to Soichi Kinouchi, filed Aug. 23, 2022 (33 pages).
U.S. Appl. No. 17/893,801 to Soichi Kinouchi, filed Aug. 23, 2022 (25 pages).

* cited by examiner

ACCELERATOR PEDAL SYSTEM

CROSS REFERENCE TO RELATED APPLICATION

The present application is based on and claims the benefit of priority of Japanese Patent Application No. 2021-137425, filed on Aug. 25, 2021, the disclosure of which is incorporated herein by reference.

TECHNICAL FIELD

The present disclosure generally relates to an accelerator pedal system.

BACKGROUND

Conventionally, there is known a vehicle travel control device in which a reaction force against stepping on a pedal is increased so as to make an accelerator pedal function as a footrest. For example, a request for switching from an ON time to an OFF time of an auto speed control device (ASCD) is detected by a depression pressure (i.e., pedaling force) of the accelerator pedal or in accordance with an opening degree of an accelerator.

For example, when the pedal is stepped and depressed accidentally, inadvertently or the like, due to disturbance such as a steep deceleration, vibration or the like, the footrest state is released without a driver's intention of acceleration, which may lead to an unintended acceleration of the vehicle.

SUMMARY

It is an object of the present disclosure to provide an accelerator pedal system capable of appropriately controlling a vehicle drive force for driving a vehicle.

An accelerator pedal system according to an aspect of the present disclosure includes a pedal lever, a lock mechanism, an actuator, and a controller. The pedal lever is configured to operate in accordance with a step-on operation. The lock mechanism is configured to restrict the operation of the pedal lever. The actuator is configured to switch between a locked state in which the operation of the pedal lever is restricted by the lock mechanism and an unlocked state in which the operation of the pedal lever is free from restriction by the lock mechanism. The controller includes an actuator control unit configured to control the actuator, and a vehicle drive control unit configured to control a vehicle drive force. The vehicle drive control unit is configured to suppress the vehicle drive force in accordance with an opening degree of the pedal lever, when (i) a disturbance is detected and (ii) the locked state is released during a travel of the vehicle with the pedal lever in the locked state, as compared with a case where no disturbance is detected. In such manner, the vehicle drive force is appropriately controllable.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

An accelerator pedal system of the present disclosure is described with reference to the drawing. In plural embodiments described herein, the same configuration bears, basically, the same reference sign/numeral, and redundant description of the same configuration is avoided.

Embodiment

Figure 1:
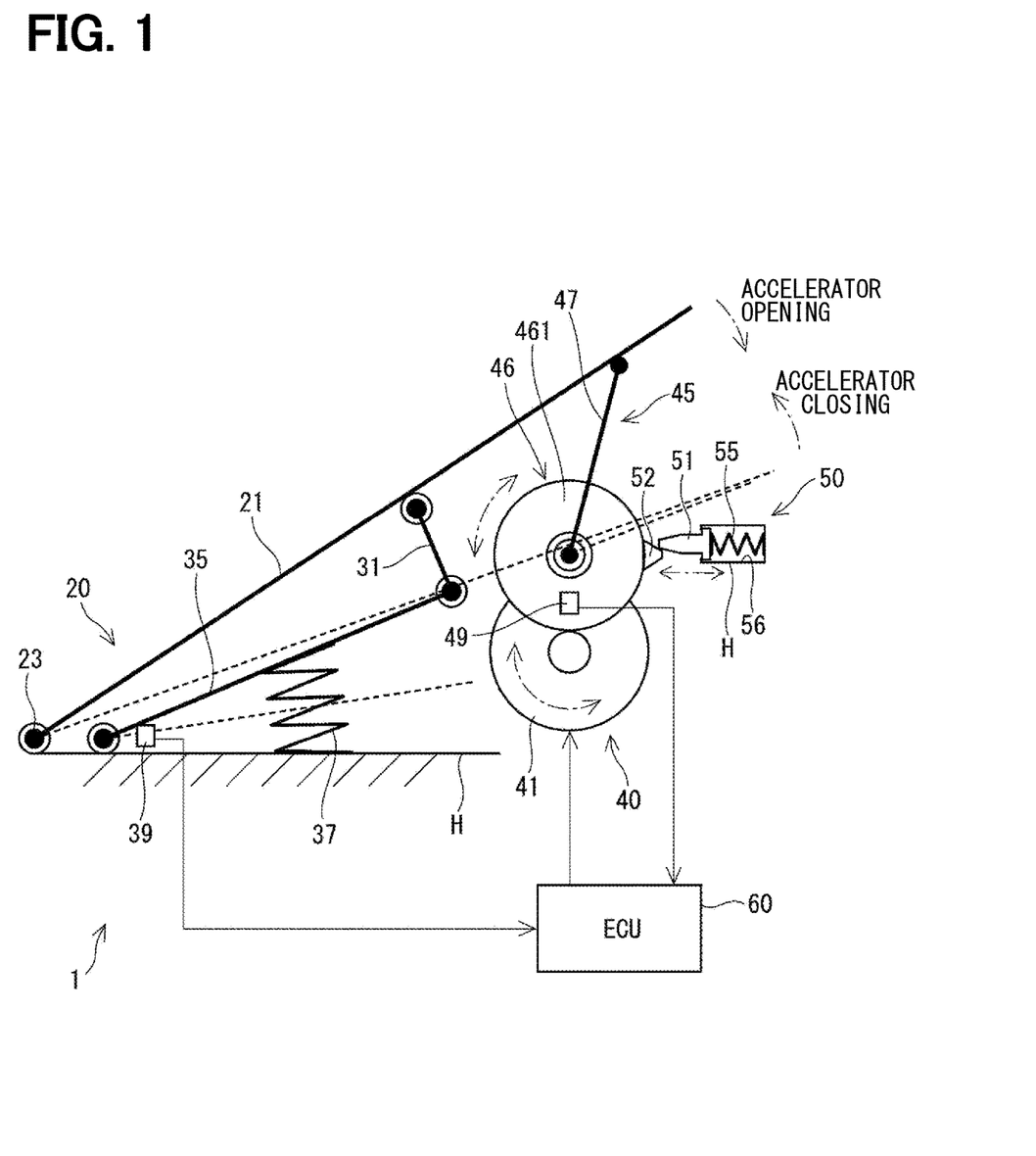
FIG. 1 is a schematic diagram illustrating an accelerator pedal system according to an embodiment.

Hereinafter, an accelerator pedal system according to the present disclosure will be described with reference to the drawings. An embodiment is typically illustrated in FIGS. 1 to 9. As illustrated in FIG. 1, an accelerator pedal system 1 includes a pedal lever 20, an actuator 40, a power transmission mechanism 45, a lock mechanism 50, an electronic control unit (ECU) 60 serving as a controller, and the like.

The pedal lever 20 includes a pad 21, an arm 31, and a pedal 35, and is integrally driven by a driver's step-on operation or the like. The pad 21 is provided operable by a driver's step-on operation. The pad 21 is rotatably supported by a fulcrum member 23 provided on a housing H. FIG. 1 illustrates a so-called floor type (organ type) pedal in which the pad 21 is provided to extend in a direction along one surface of the housing H. However, a suspension type (pendant type) pedal may be used. In the present embodiment, the housing portions such as a pedal housing and a motor housing that are not driven by driving of a motor 41 or a step-on operation of the pedal lever 20 are collectively referred to as a "housing H".

The arm 31 couples between the pad 21 and the pedal 35. One end of the pedal 35 is rotatably supported by the housing H, and the other end is connected to the arm 31. With this arrangement, the pad 21, the arm 31, and the pedal 35 are integrally driven by an operation of the pad 21 by the driver. A pedal opening degree sensor 39 that detects a pedal opening degree $\theta$ is provided on one end side of the pedal 35.

Figure 2:
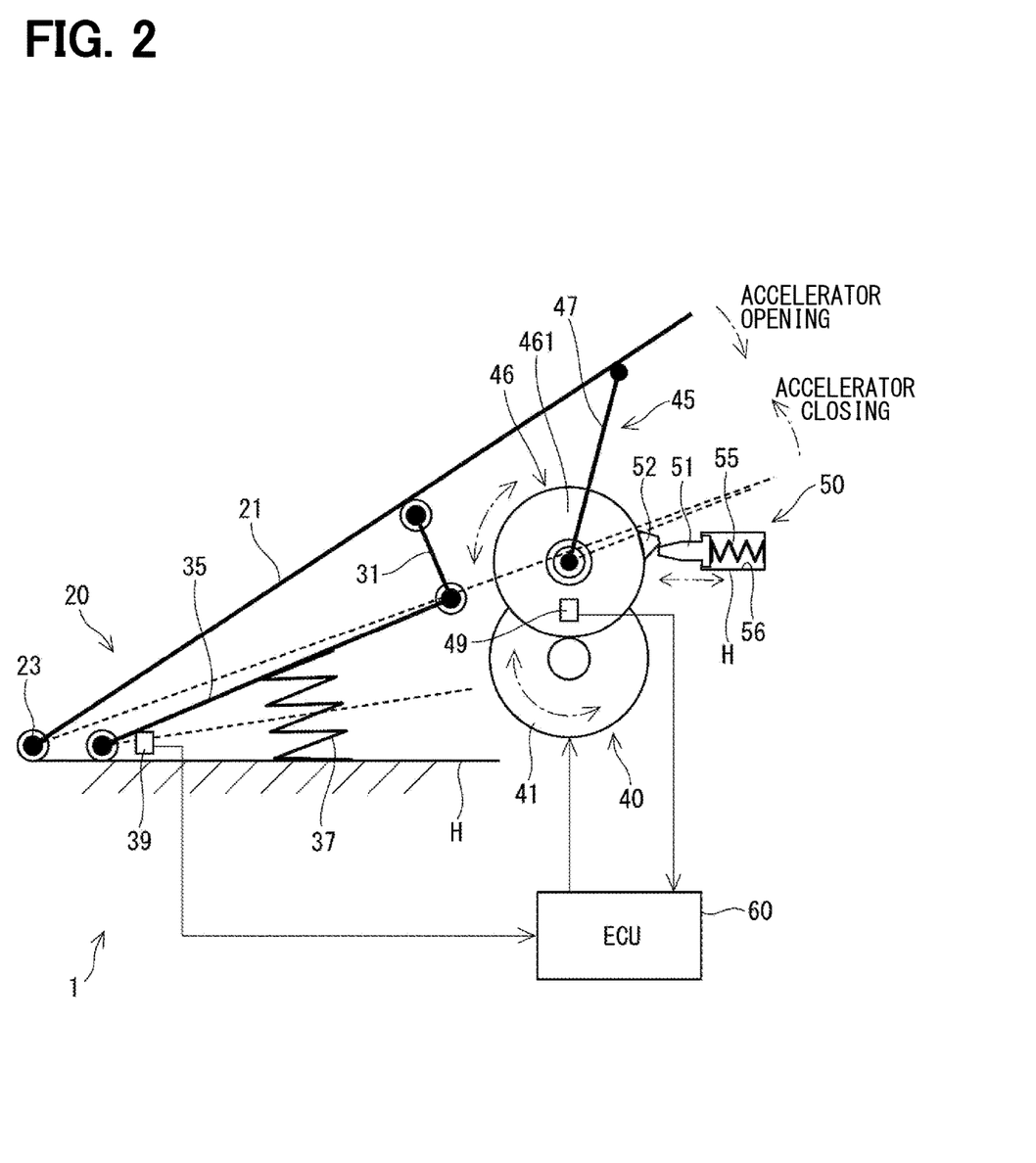
FIG. 2 is a schematic diagram illustrating a state where a pedal lever is locked in the accelerator pedal system according to the embodiment.

A pedal biasing member 37 is a compression coil spring and biases the pedal 35 in an accelerator closing direction, with one end fixed to the pedal 35 and the other end fixed to the housing H. In FIGS. 1 and 2, the solid lines depict a state of fully closed acceleration, and the broken lines depict a state of fully opened acceleration.

The actuator 40 includes the motor 41 and a power transmission mechanism 45. The motor 41 is, for example, a DC motor, and driving of the motor 41 is controlled by the ECU 60. The driving force of the motor 41 is transmitted to the pedal lever 20 via the power transmission mechanism 45. It can be said that the actuator 40 is a series of components that transmits power from the motor 41 as a drive source to the pedal lever 20 via the power transmission mechanism 45.

The power transmission mechanism 45 includes a gear set 46, a power transmission member 47, and the like. The gear set 46 is configured with: a motor gear that rotates integrally with a motor shaft; and a plurality of gears that mesh with the motor gear, and the gear set 46 transmits the driving force of the motor 41 to the power transmission member 47. The gear set 46 includes a gear 461 that is provided with a locked portion 52 to be locked as described later. The gear 461 is provided with a position sensor 49 that detects a rotational position. Hereinafter, the rotational directions of the motor 41, the gear 461, and the like when the gear 461 is rotated counterclockwise on the paper surface are defined as positive, and the rotational directions of the motor 41, the gear 461, and the like when the gear 461 is rotated clockwise on the paper surface are defined as negative.

The power transmission member 47 is, for example, a cam, and one end side of the power transmission member 47 meshes with the gear set 46, so that the power transmission member 47 is rotationally driven by driving of the motor 41. The other end side of the power transmission member 47 is in contact with the pedal lever 20. With this arrangement, the driving force of the motor 41 is transmitted to the pedal lever 20. In FIG. 1, the other end of the power transmission member 47 is in contact with the pad 21, but may be in contact with the arm 31 or the pedal 35.

By rotating the motor 41 in the positive direction in a state where the power transmission member 47 and the pedal lever 20 are in contact with each other, it is possible to apply a reaction force in a push-back direction to the pedal lever 20. In addition, when no reaction force is applied to the pedal lever 20, it is desirable to rotate the motor 41 in the negative direction and thereby to retract the power transmission member 47 so that the pedal lever 20 and the power transmission member 47 will not be in contact with each other in the entire range from the fully closed state to the fully opened state of the pedal lever 20. Therefore, when no reaction force is applied, it is possible to prevent a cogging torque or the like from the power transmission mechanism 45 side from affecting a depression force.

By applying a reaction force in the push-back direction to the pedal lever 20 by the motor 41, for example, by applying a reaction force to provide a sense of wall when a fuel consumption is determined, on the basis of the driving situation, to be deteriorated if the pad 21 is stepped on, the stepping on of the pad 21 by the driver is prevented or reduced. Accordingly, a fuel efficiency can be improved. Further, for example, by pulse-driving the pedal lever 20 in the push-back direction, the pulse-driving can be used to transmit information such as notification of switching from automatic driving to manual driving.

The lock mechanism 50 includes a locking member 51, a locked portion 52 to be locked, a resilient member 55, and the like. The locking member 51 has a tapered surface formed on one end side of the locking member 51 and is disposed such that the tapered surface is in contact with the locked portion 52. The other end side of the locking member 51 is accommodated in an accommodation chamber 56 formed on the housing H and is provided to be reciprocally movable in the axial direction. The locked portion 52 is provided to protrude from the gear 461 constituting the gear set 46, and rotates integrally with the gear 461. The locked portion 52 comes into contact with the locking member 51 on the tapered surface.

The resilient member 55 is accommodated in the accommodation chamber 56 provided on the housing H. One end of the resilient member 55 is in contact with the locking member 51, and the other end is engaged with the housing H, whereby the resilient member 55 biases the locking member 51 toward the locked portion 52.

FIG. 1 illustrates a state when locking is just started. When the gear 461 is rotated counterclockwise on the paper surface by the driving force of the motor 41 in a state where the locked portion 52 and the locking member 51 are in contact with each other, the locked portion 52 pushes the locking member 51 and thereby compresses the resilient member 55. When the gear 461 is further rotated counterclockwise and the locked portion 52 goes over and gets around the locking member 51 to the upper side on the paper surface, the locking member 51 returns to an initial position by a biasing force of the resilient member 55.

As illustrated in FIG. 2, in a locked state, since the locking member 51 latches the locked portion 52 by the biasing force of the resilient member 55, the rotation of the gear 461 is restricted. In addition, the power transmission member 47 functions as a locking force transmission member, so that the operation of the pedal lever 20 is restricted. As a result, the operation of the pedal lever 20 can be restricted in a non-energized state in which the energization of the motor 41 is turned off.

Hereinafter, to restrict the operation of the pedal lever 20 is simply referred to as "to lock". For example, during automatic driving or the like, it is possible to secure comfort by locking the pedal lever 20 and by thus making the pad 21 function as a footrest. In the present embodiment, the description is given, assuming that the pedal lever 20 is locked at a fully closed position.

When the gear 461 is rotated clockwise on the paper surface from the locked state illustrated in FIG. 2 by the driving force of the motor 41, the locked portion 52 pushes the locking member 51, so that the resilient member 55 is compressed. When the locked portion 52 goes over and gets around the locking member 51 to the lower side on the paper surface, the locked state is released, so that the locking member 51 returns to the initial position by the biasing force of the resilient member 55. Also, when a predetermined depression force or more is applied to the pedal lever 20, the locked state can be similarly released.

When the pedal lever 20 is kept unlocked, it is desirable to further rotate the gear 461 clockwise from the state illustrated in FIG. 1 to retract the locked portion 52 so that the locking member 51 and the locked portion 52 will not come into contact with each other.

Figure 3:
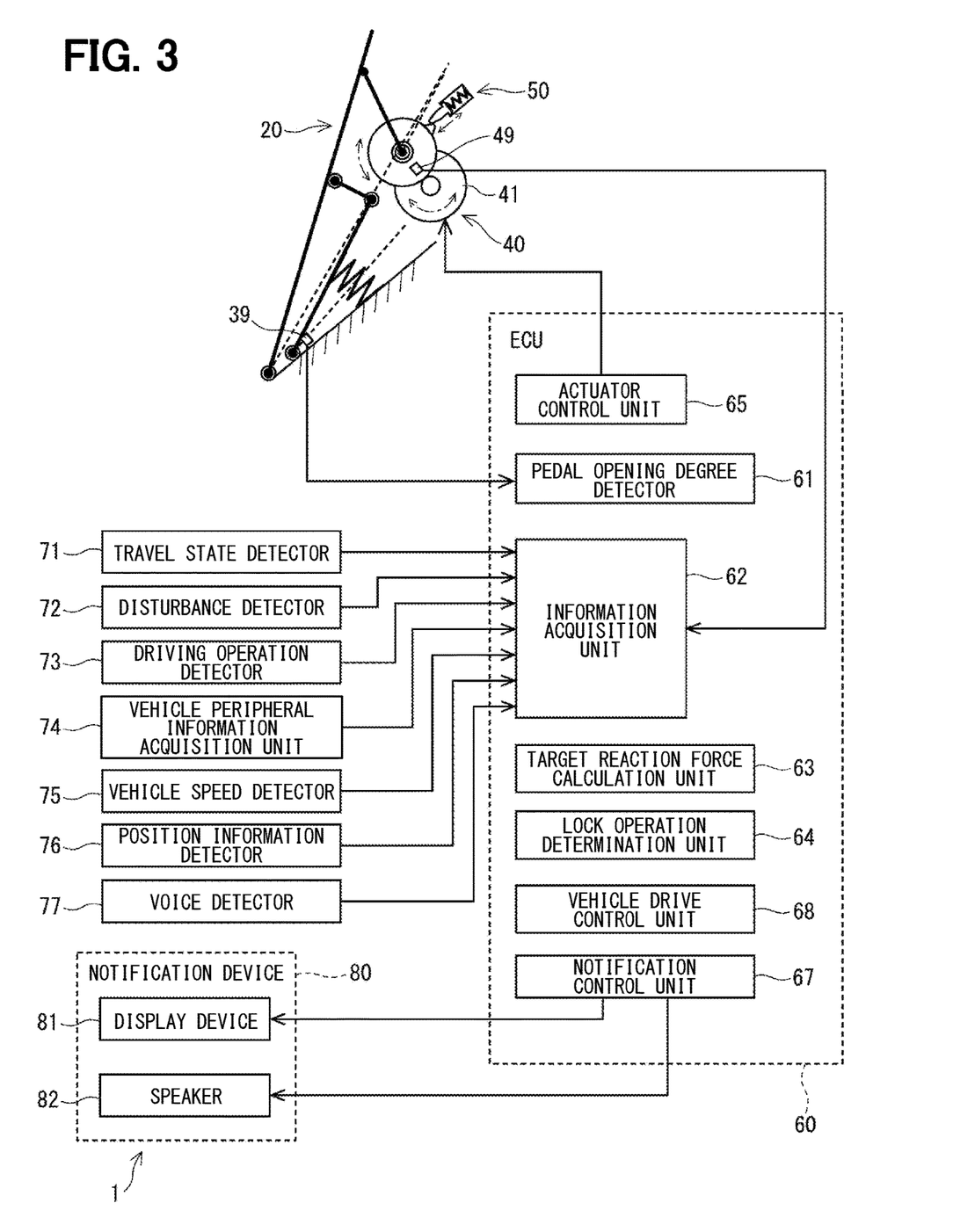
FIG. 3 is a block diagram illustrating a control configuration of the accelerator pedal system according to the embodiment.

As illustrated in FIG. 3, the ECU 60 is mainly configured with a microcomputer or the like, and includes therein: a central processing unit (CPU), a read-only memory (ROM), a random-access memory (RAM), an input/output interface (I/O), which are all not illustrated; a bus line that connects these components; and other components. Processes in the ECU 60 may be realized by software processing that is performed by the CPU executing a program previously stored in a physical memory device such as a ROM or the like (that is, a readable non-transitory tangible recording medium), and the processes may be realized by hardware processing performed by a dedicated electronic circuit.

The ECU 60 includes, as functional blocks: a pedal opening degree detector 61; an information acquisition unit 62; a target reaction force calculation unit 63; a lock operation determination unit 64; an actuator control unit 65; a notification control unit 67; a vehicle drive control unit 68; and the like. Although the ECU 60 is depicted as a single ECU 60 in FIG. 3, some of the functions may be configured with a separate ECU or the like.

The pedal opening degree detector 61 detects the pedal opening degree θ on the basis of a detection value of the pedal opening degree sensor 39. The information acquisition unit 62 acquires various types of information from the following components: the position sensor 49, a travel state detector 71, a disturbance detector 72, a driving operation detector 73, a vehicle peripheral information acquisition unit 74, a vehicle speed detector 75, a position information detector 76, a voice detector 77, and the like.

The target reaction force calculation unit 63 calculates a target reaction force to be applied to the pedal lever 20. On the basis of various types of information acquired by the information acquisition unit 62, the lock operation determination unit 64 makes a determination related to switching between a locked state in which the pedal lever 20 is locked and an unlocked state in which the pedal lever 20 is not locked. Hereinafter, as appropriate, switching from the unlocked state to the locked state is referred to as "lock activation" or "locking", and switching from the locked state to the unlocked state is referred to as "lock releasing" or "unlocking". The actuator control unit 65 controls driving of the motor 41 on the basis of the target reaction force, a determination result of the lock operation determination unit 64, and the like.

Figure 5A:
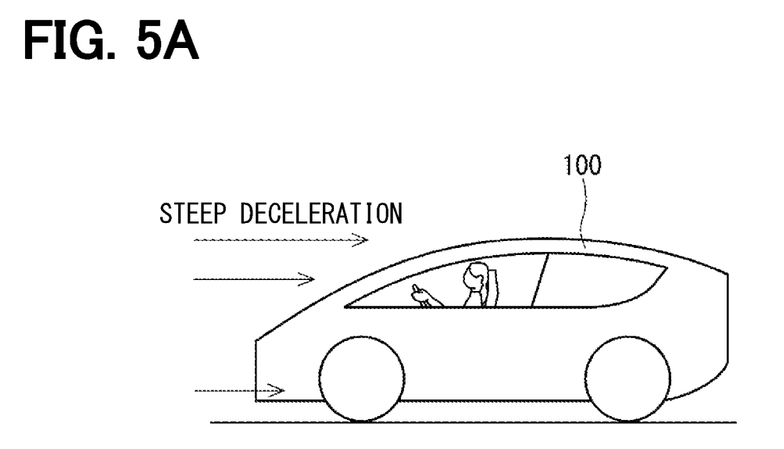
FIG. 5A is a diagram showing a vehicle steep deceleration state.

The notification control unit 67 notifies the notification device 80 of information that the driver is to be notified of. In the present embodiment, information related to lock activation and lock releasing of the pedal lever 20 is notified of. The vehicle drive control unit 68 controls driving of a vehicle 100, as shown in FIG. 5A and other drawings.

The travel state detector 71 detects a driving mode as a traveling state. The driving mode includes an override mode in addition to an automatic driving mode and a manual driving mode. The control in the automatic driving mode is a cruise control such as an adaptive cruise control (ACC), but details of the control does not matter. In the override mode, both an input from the control by the automatic driving and a step-on input from the driver are input, and the input by the step-on operation of the driver is always prioritized in the override mode.

The disturbance detector 72 detects a disturbance on the basis of information of a G sensor that detects acceleration, a suspension behavior detection device, an indoor camera 95 (see FIG. 7), and the like. The disturbance includes, for example, a deceleration G caused by a relatively steep deceleration, a vehicle vibration caused by a stepped road surface and the like. Further, the disturbance may include non-driving-operation motions that are motions other than normal driving motions, for example, reseating of the driver, wearing and removing the seat belt, picking up a fallen object, stretching, and a driver's state of consciousness.

The driving operation detector 73 detects a turn signal operation and a steering wheel manipulation by the driver. The vehicle peripheral information acquisition unit 74 detects oncoming other vehicles, obstacles, and the like by road-to-vehicle communication, vehicle-to-vehicle communication, an onboard camera, radar, and the like.

The vehicle speed detector 75 detects a vehicle speed, which is a traveling speed of a vehicle 100 (own vehicle). The vehicle speed detector 75 does not have to use a vehicle speed sensor, and may be configured to detect the vehicle speed by performing calculation using positional data of the global positioning system (GPS). The position information detector 76 detects the current position of the vehicle 100 on the basis of information from map information, the GPS, road-to-vehicle communication, an onboard camera, and the like. The position information detector 76 may use the above-described types of information alone or in combination. In addition, information other than the above-described information may be used.

The voice detector 77 detects a voice emitted by an occupant. The notification device 80 includes: a display device 81, which is a display or the like; and a speaker 82, and notifies the driver of various types of information.

Now, even if the driver does not intend to accelerate, when deceleration acceleration speed (hereinafter, "deceleration G") is applied due to sudden deceleration of the vehicle 100, or when vibration occurs due to a stepped road surface, for example, a depression force (i.e., pedaling force) may be applied to the pedal lever 20 serving as a footrest, leading to an unlock of the pedal lever 20 without an intention of the driver to accelerate. Therefore, in the present embodiment, in order to suppress an unintended sudden start, when the lock of the pedal lever 20 is released while a disturbance is occurring, the vehicle drive force in accordance with the pedal opening degree θ is suppressed.

Figure 4:
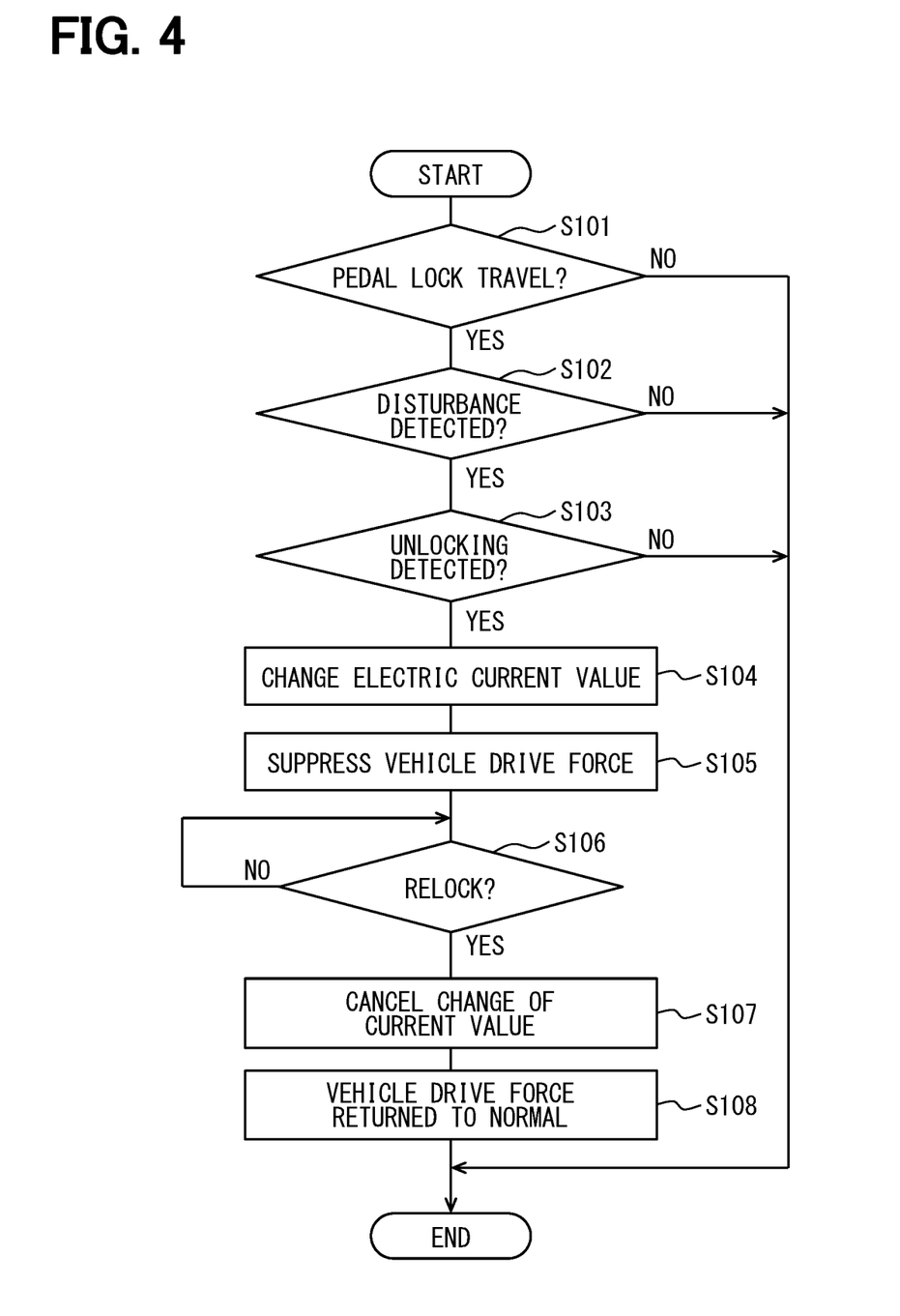
FIG. 4 is a flowchart showing a lock operation control process according to the embodiment.

A lock operation control process of the present embodiment will be described with reference to the flowchart of FIG. 4. Such a process is performed by the ECU 60 at a predetermined cycle. Hereinafter, the term "step" in a phrase such as step S101 is omitted, and is simply written as the symbol "S."

In S101, the ECU 60 determines whether or not the vehicle is traveling in a locked state of the pedal lever 20. Hereafter, a vehicle traveling in a state where the pedal lever 20 is locked may be designated as a pedal lock travel. When it is determined that the vehicle is not in the pedal lock travel (S101: NO), the process in and after S102 is skipped. When it is determined that the vehicle is in the pedal lock travel (S101: YES), the process proceeds to S102.

In S102, the lock operation determination unit 64 determines whether or not a disturbance is detected. A disturbance will be described in detail with reference to FIGS. 5 to 7. When it is determined that no disturbance is detected (S102: NO), the process in and after S103 is skipped. When it is determined that a disturbance is detected (S102: YES), the process proceeds to S103.

In S103, the lock operation determination unit 64 determines whether or not the unlocking of the pedal lever 20 is detected. When it is determined that the pedal lever 20 is in the locked state (S103: NO), the process in and after S104 is skipped. When it is determined that the unlocking of the pedal lever 20 is detected (S103: YES), the process proceeds to S104.

In S104, the actuator control unit 65 changes a value of an electric current supplied to the motor 41. In the present embodiment, since the pedal lever 20 is not energized while it is locked, the motor 41 is energized so as to relock the pedal lever 20.

In S105, the vehicle drive control unit 68 suppresses the vehicle drive force according to the pedal opening degree θ. Specifically, the vehicle drive control unit 68 sets a drive force suppression flag, and switches a drive mode from a normal mode to a drive force suppression mode.

Figure 8:
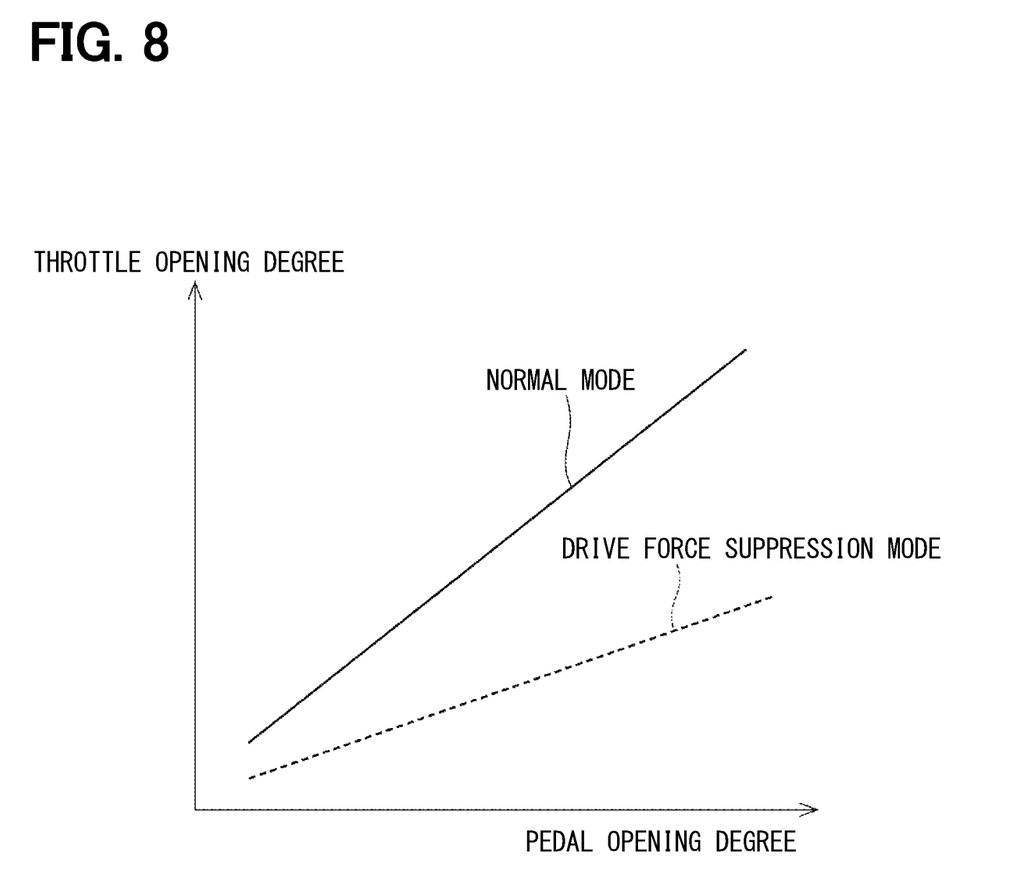
FIG. 8 is a diagram showing a drive force suppression according to the embodiment.

The details of the drive force suppression according to the pedal opening degree θ will be described with reference to FIG. 8. In FIG. 8, the horizontal axis is the pedal opening degree θ, the vertical axis is a throttle opening degree, the normal mode is shown by a solid line, and the drive force suppression mode is shown by a broken line. In the present embodiment, when the lock of the pedal lever 20 is released due to a disturbance, the drive force suppression mode is set and the throttle opening degree according to the pedal opening degree θ is reduced to suppress the vehicle drive force according to the pedal opening degree θ. If the vehicle 100 is an electric vehicle, the drive force of the main motor according to the pedal opening degree θ may be suppressed.

Returning to FIG. 4, in S106 which is subsequent to S105, the lock operation determination unit 64 determines whether or not the pedal lever 20 is relocked. When it is determined that the pedal lever 20 is not relocked (S106: NO), the energization of the motor 41 is continued. When it is determined that the pedal lever 20 is relocked (S106: YES), the process proceeds to S107.

In S107, the actuator control unit 65 cancels a change of the electric current value applied to the motor 41. For example, in the present embodiment, the energization of the motor 41 is turned off. Even if the locked state of the pedal lever 20 is not released, when a disturbance is being detected, the electric current value applied to the motor 41 may be continuously changed.

In S108, the vehicle drive control unit 68 returns the vehicle drive force according to the pedal opening degree θ to normal. Specifically, the drive force suppression flag is reset, and the drive mode is switched from the drive force suppression mode to the normal mode.

Figure 5B:
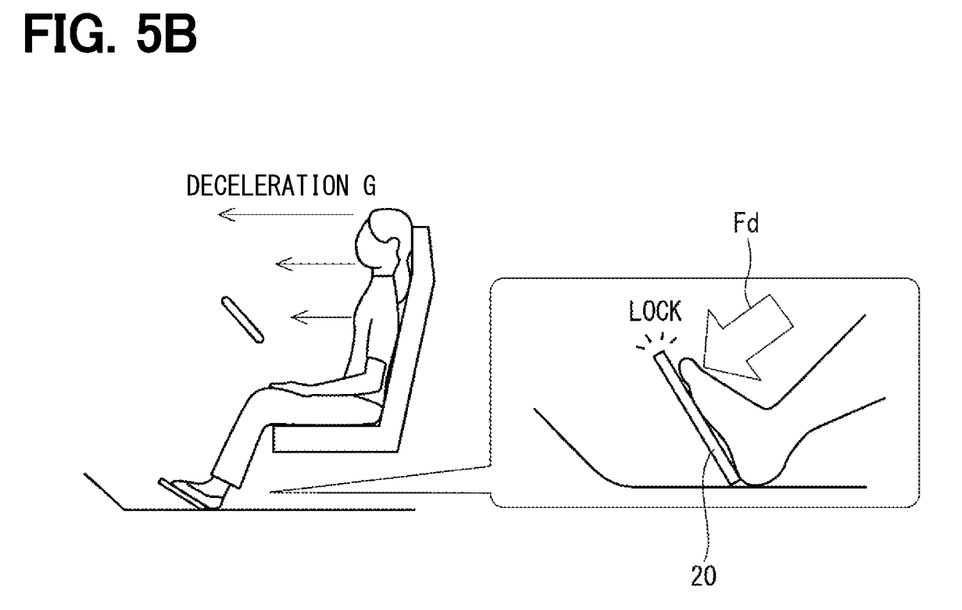
FIG. 5B is a diagram showing a disturbance depression force (i.e., disturbance pedaling force) due to deceleration.

Here, a specific example of the disturbance will be described. When the vehicle 100 suddenly decelerates (i.e., a steep deceleration) as shown in FIG. 5A, deceleration G occurs as shown in FIG. 5B, and there is a possibility that the pedal lever 20 is unintentionally moved, or depressed, by a disturbance depression force Fd. Therefore, in the present embodiment, when the deceleration G exceeds a determination threshold value, it is detected as a disturbance.

Figure 6A:
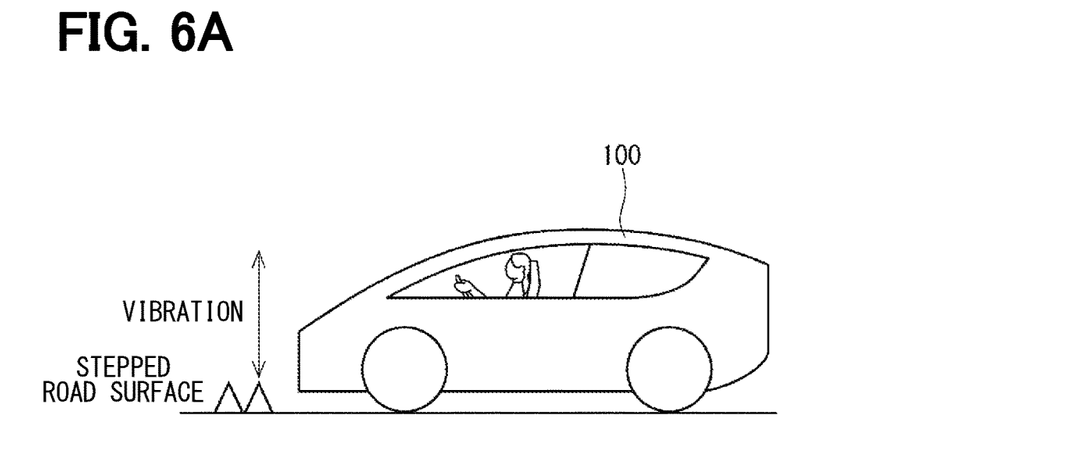
FIG. 6A is a diagram showing a vibration generated state in a vehicle.
Figure 6B:
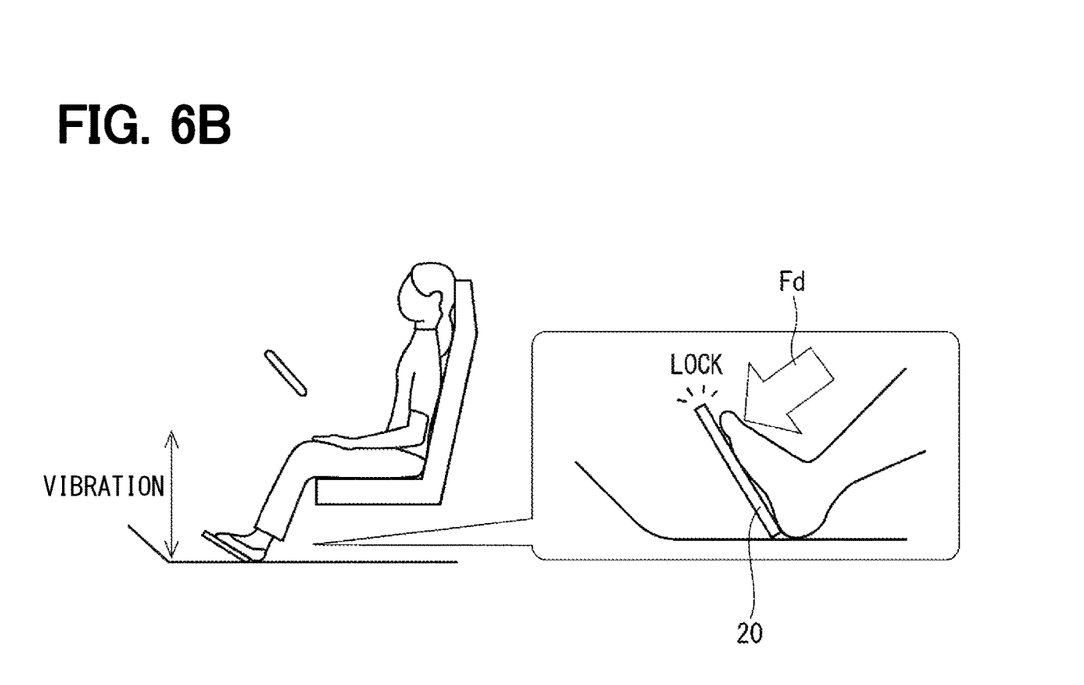
FIG. 6B is a diagram showing a disturbance depression force (i.e., disturbance pedaling force) due to vibration.

As shown in FIG. 6A, when vibration is generated in the vehicle 100 due to a stepped road surface or the like, there is a possibility that the pedal lever 20 is unintentionally moved, or depressed, by the disturbance depression force Fd as shown in FIG. 6B. Therefore, in the present embodiment, when a detection value related to the vibration detected by the G sensor or the suspension behavior detection device exceeds the determination threshold value, it is detected as a disturbance.

Figure 7:
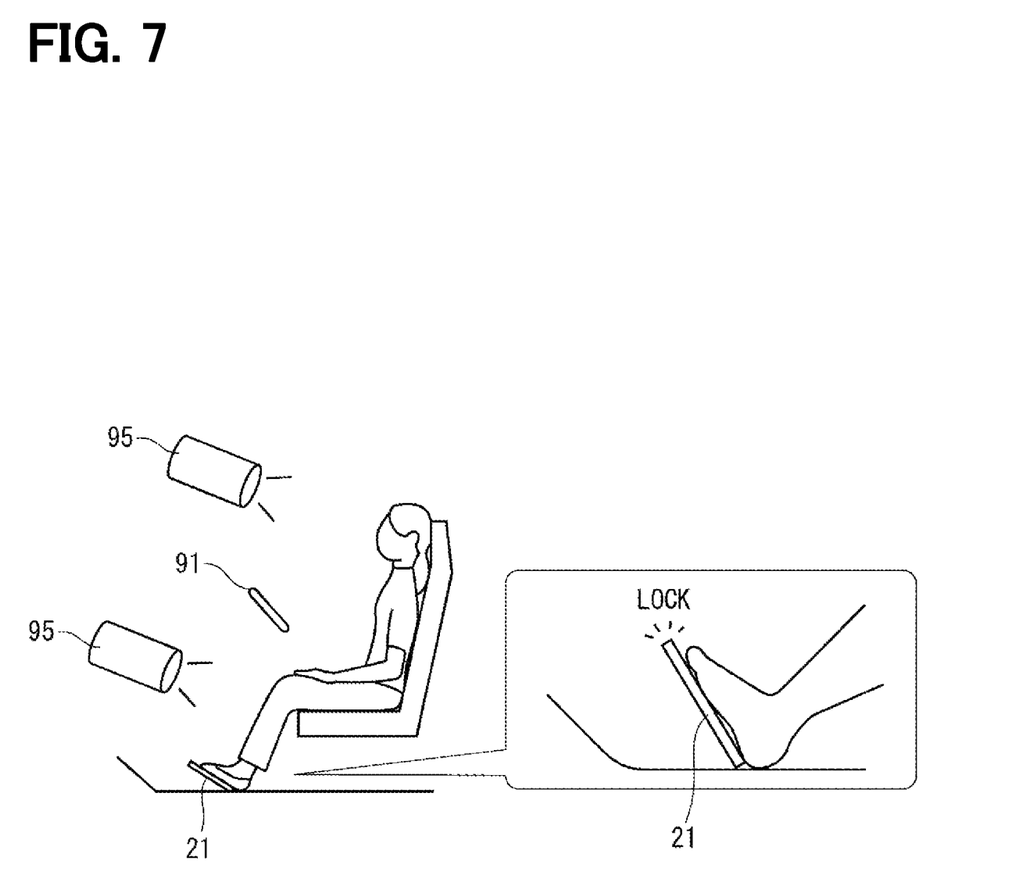
FIG. 7 is a diagram showing how disturbance is detected by using a camera.

Further, as shown in FIG. 7, when an irrelevant-to-driving operation by the driver is detected by the indoor camera 95, it is detected as a disturbance. The irrelevant-to-driving operation includes, for example, reseating, wearing and removing the seat belt, picking up a fallen object, stretching, a physical abnormality and the like.

Figure 9:
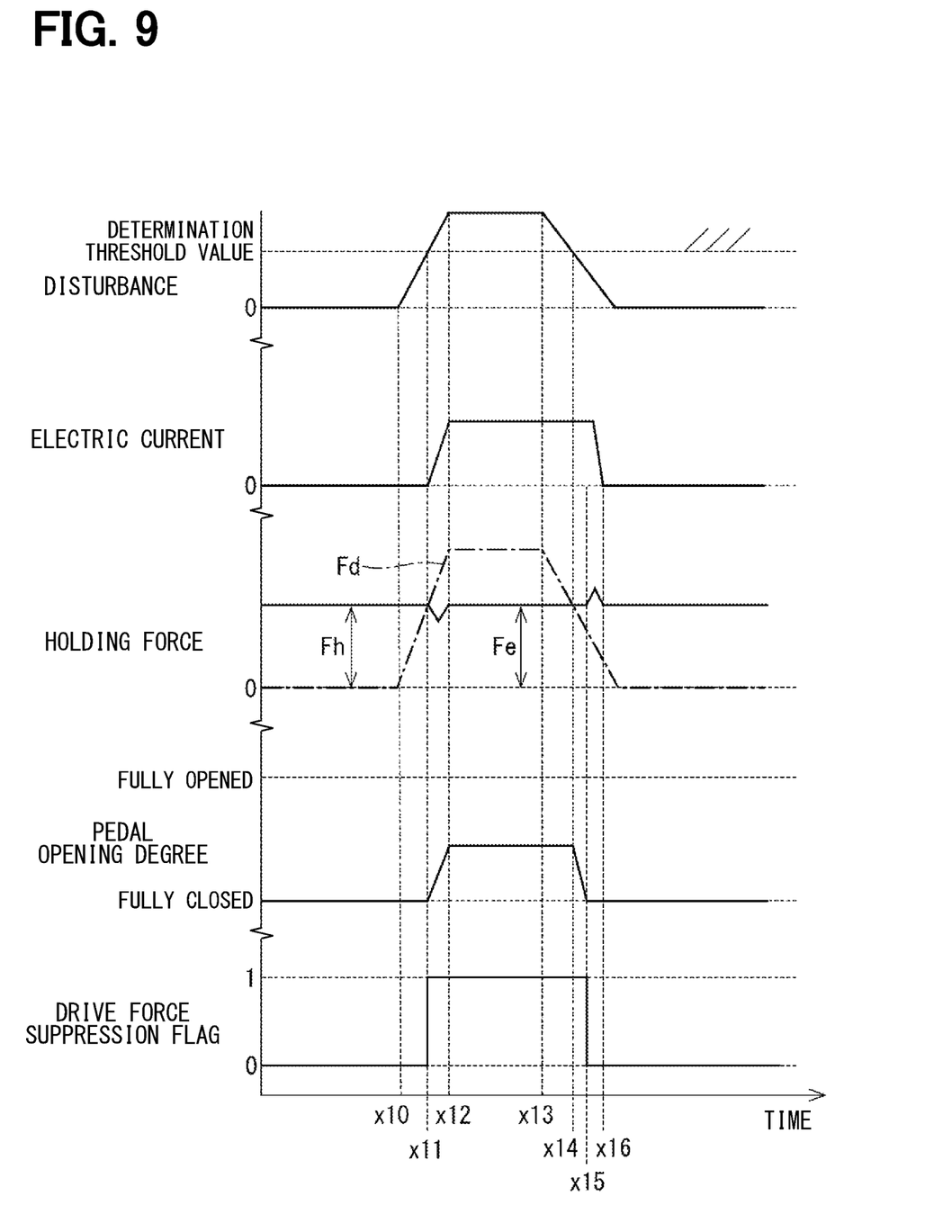
FIG. 9 is a time chart showing a lock operation control process according to the embodiment.

The lock operation control process of the present embodiment will be described with reference to the time chart of FIG. 9. In FIG. 9, the common time axis for five rows of graph is the horizontal axis, and from an upper row, a disturbance, an electric current applied to the motor 41, a lock holding force of the lock mechanism 50, a pedal opening degree θ, and a drive force suppression flag are shown. Here, it is assumed that a non-energized lock holding force Fh and an energized lock holding force Fe are equal to each other. Further, for the sake of simplification of the explanation, it is assumed that the pedal lock position is a fully closed position.

It is assumed that, at or before the time x10, no disturbance is occurring and the pedal lock travel is performed. When the disturbance depression force Fd increases due to an occurrence of disturbance at time x10, and the disturbance depression force Fd exceeds the non-energized lock holding force Fh at time x11, the locked state of the pedal lever 20 is released by the disturbance depression force Fd. Further, the drive force suppression flag is set, and the vehicle drive force in accordance with the pedal opening degree θ is suppressed.

When the disturbance depression force Fd is held at time x12, the pedal lever 20 is held at an opening degree at which the disturbance depression force Fd and the energized lock holding force Fe are balanced to be equal to each other in the absolute value. When the disturbance depression force Fd starts to decrease at time x13 and becomes smaller than the energized lock holding force Fe at time x14, the pedal opening degree θ decreases.

When the pedal opening degree θ returns to a lock operation position (e.g., θ=0) at time x15, the pedal lever 20 is locked. Further, the drive force suppression flag is reset, and the vehicle drive force according to the pedal opening degree θ is returned to normal. In the pedal locked state, the driving of the vehicle 100 is controlled substantially by an automatic driving control regardless of the pedal opening degree θ. When the locking of the pedal lever 20 is complete at time x16, the energization of the motor 41 is turned off. The energization may be turned off after a lapse of a predetermined time from the completion of the pedal lock.

When a disturbance occurs, the pedal lever 20 may be unintentionally unlocked due to an influence of the disturbance. Therefore, in the present embodiment, when the lock of the pedal lever 20 is released in a state where a disturbance is generated, the vehicle drive force according to the pedal opening degree θ is suppressed. In such manner, it is possible to suppress an acceleration which is not intended by the driver.

As described above, the accelerator pedal system 1 of the present embodiment includes the pedal lever 20, the lock mechanism 50, the actuator 40, and the ECU 60. The pedal lever 20 operates in accordance with a step-on operation. The operation of the pedal lever 20 can be restricted by the lock mechanism 50. Here, the expression "the operation of the pedal lever can be restricted" is not limited to setting the movement amount to 0 by completely/rigidly fixing the pedal lever 20, but is a concept including setting the movement amount to be smaller than that in the unlocked state. The actuator 40 switches between a locked state in which the operation of the pedal lever 20 is restricted by the lock mechanism 50 and an unlocked state in which the operation thereof is not restricted.

The ECU 60 includes the actuator control unit 65 and the vehicle drive control unit 68. The actuator control unit 65 controls the drive of the actuator 40 in accordance with the determination result of the lock operation determination unit 64. In the present embodiment, the drive of the motor 41 is mainly controlled by such determination result. The vehicle drive control unit 68 controls the drive of the vehicle 100.

The vehicle drive control unit 68 suppresses the vehicle drive force when a disturbance is detected and the locked state is released during a travel of the vehicle 100 in the locked state, as compared with a case where the disturbance is not detected.

The disturbance is a negative acceleration (i.e., decelerating acceleration) applied at the time of vehicle deceleration. The disturbance may also be a vibration in a vertical direction of the vehicle. Furthermore, the disturbance may also be an irrelevant-to-driving operation of the driver. When such a disturbance is detected, an unintended acceleration not intended by the driver is suppressible by changing the amount of energization to the motor 41. In the present embodiment, the disturbance includes the deceleration G, vibration components, and the irrelevant-to-driving operation, for example. However, some of them may be omitted or some other elements may be detected as disturbance.

The lock mechanism 50 can hold the locked state in a state where the power supply to the actuator 40 is turned off. For example, when the energization of the motor 41 is turned off in the locked state, there is a higher risk of unlocking due to the influence of disturbance or the like, as compared with a case where the energization of the motor 41 is continued by feedback control or the like. Therefore, as shown in the present embodiment, when the lock is released in a state where a disturbance is detected, suppressing the vehicle drive force according to the pedal opening degree θ is effective in a system capable of non-energized lock.

OTHER EMBODIMENTS

In the above embodiments, the locking member 51 is provided on a fixed side (i.e., as a fixed component), and the locked portion 52 is provided on a movable side (i.e., as a movable component). In other embodiments, the locking member may be provided on a movable side, and the locked portion may be provided on the fixed side. In the above embodiments, the locked portion is formed of a projection. In other embodiments, the locked portion may be formed of a recess. One of the locked portion and the locking member does not have to be provided on a spur gear, and may be provided on a member other than a spur gear that constitutes the power transmission mechanism.

In the above embodiments, the locking member is provided to be movable in a linear direction along the axial direction of the resilient member, which is a compression coil spring. In other embodiments, the locked state and the unlocked state may be switched by the rotation of the locking member. When the state of locking is switched by the rotation of the locking member, it is possible to reduce uneven wear of an abutting portion. In other embodiments, the resilient member does not have to be a compression coil spring, and may be a torsion spring, for example. Alternatively, the locking member itself may be formed of an elastic member such as rubber, and may be elastically deformed to switch the state of locking.

In addition, the power transmission mechanism and the lock mechanism may be different from those in the above embodiments. The shapes of the locking member and the locked portion may be different from those in the above embodiments, depending on component layout or the like. In the above embodiments, a common actuator is used to apply a reaction force to the pedal lever and to activate a locking operation. In other embodiments, an actuator for applying a reaction force and an actuator for activating a lock operation may be separately provided.

In the above embodiments, the lock mechanism can hold the locked state in a non-energized state where energization of the motor is turned off. In other embodiments, the lock mechanism may be configured to maintain the locked state by continuously energizing the motor.

In the above embodiments, the pedal lever is locked at the fully closed position by the lock mechanism. In other embodiments, the pedal lever may be locked at the fully opened position or may be locked at an intermediate position between the fully closed position and the fully opened position. Further, the pedal lever may be configured to be locked in a stepwise manner at a plurality of positions.

In the above embodiments, notification to the driver is performed at the time of lock activation and the time of lock releasing. In other embodiments, at least one of the notification at the time of lock activation and the notification at the time of lock releasing may be omitted. Whether to notify or not to notify may be changed depending on situations. For example, a notification may be performed immediately after the start of automatic driving, and a notification may be not performed at the time of lock activation when an override is terminated during automatic driving. The same applies to whether to confirm or not to confirm the driver's intention related to lock activation and lock releasing. Further, regarding the lock activation and lock releasing, the driver's intention may be confirmed.

In the above embodiments, when the locked state of the pedal lever 20 is released due to a disturbance during a pedal lock travel, the amount of energization to the motor 41 is changed. In other embodiments, S104 and S107 may be omitted in FIG. 4. In this case, the amount of energization to the motor 41 may be kept unchanged when releasing the lock of the pedal lever 20 under the influence of the disturbance.

An accelerator pedal system for a vehicle according to an aspect of the present disclosure includes: a pedal lever configured to operate in accordance with a step-on operation; a lock mechanism configured to restrict the operation of the pedal lever; an actuator configured to switch between a locked state in which the operation of the pedal lever is restricted by the lock mechanism and an unlocked state in which the operation of the pedal lever is free from restriction by the lock mechanism; and a controller including at least one processor configured to control the actuator and to control a vehicle drive force. The controller is configured to detect a disturbance during a travel of the vehicle, and to control the vehicle drive force in accordance with an opening degree of the pedal lever in the unlocked state when no disturbance is detected. The controller may be configured to reduce the vehicle drive force in accordance with the opening degree of the pedal lever, when (i) the disturbance is detected and (ii) the locked state is released during the travel of the vehicle.

A control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the above embodiment, and various modifications may be implemented without departing from the spirit of the present disclosure.

What is claimed is:

1. An accelerator pedal system, comprising:
    a pedal lever configured to operate in accordance with a step-on operation;
    a lock mechanism configured to restrict the operation of the pedal lever;
    an actuator configured to switch between a locked state in which the operation of the pedal lever is restricted by the lock mechanism and an unlocked state in which the operation of the pedal lever is free from restriction by the lock mechanism; and a controller including
an actuator control unit configured to control the actuator, and
a vehicle drive control unit configured to control a vehicle drive force, wherein the vehicle drive control unit is configured to suppress the vehicle drive force in accordance with an opening degree of the pedal lever, when (i) a disturbance more than a determination threshold is detected and (ii) the locked state is released during a travel of the vehicle with the pedal lever in the locked state, as compared with a case where no disturbance is detected;

the lock mechanism is capable of holding the locked state in a state where a power supply to the actuator is turned off, and the controller is configured to, when the disturbance more than the determination threshold is detected, suppress the vehicle drive force until the disturbance becomes smaller than the determination threshold, and the controller is configured to terminate the suppression of the vehicle drive force when the disturbance becomes smaller than the determination threshold.

2. The accelerator pedal system of claim 1, wherein the disturbance is a decelerating acceleration at a time when the vehicle is decelerated.

3. The accelerator pedal system of claim 1, wherein the disturbance is vibration in a vertical direction of the vehicle.

4. The accelerator pedal system of claim 1, wherein the disturbance is an operation of a driver irrelevant to driving.

5. The accelerator pedal system according to claim 1, wherein
the vehicle drive control unit is configured to set a drive mode between a normal mode and a drive force suppression mode in which the vehicle drive force in accordance with the opening degree of the pedal lever is always smaller than that in the normal mode, and
the vehicle drive control unit is configured to set the drive force suppression mode when the locked state is released, until the disturbance becomes smaller than the determination threshold.

6. The accelerator pedal system according to claim 1, wherein
the controller is configured to, when the disturbance more than the determination threshold is detected, start energization to the actuator from a state in which the actuator is turned off.

7. The accelerator pedal system according to claim 1, wherein
the controller is configured to, after terminating the suppression of the vehicle drive force when the disturbance becomes smaller than the determination threshold, turn off the energization to the actuator.

8. An accelerator pedal system for a vehicle, comprising:
a pedal lever configured to operate in accordance with a step-on operation;
a lock mechanism configured to restrict the operation of the pedal lever;
an actuator configured to switch between a locked state in which the operation of the pedal lever is restricted by the lock mechanism and an unlocked state in which the operation of the pedal lever is free from restriction by the lock mechanism; and
a controller including at least one processor configured to control the actuator, and to control a vehicle drive force, wherein
the controller is configured to detect a disturbance during a travel of the vehicle, and to control the vehicle drive force in accordance with an opening degree of the pedal lever in the unlocked state when no disturbance is detected, and
the controller is configured to reduce the vehicle drive force in accordance with the opening degree of the pedal lever, when (i) the disturbance more than a determination threshold is detected (ii) the locked state is released during the travel of the vehicle;
the lock mechanism is capable of holding the locked state in a state where a power supply to the actuator is turned off, and
the controller is configured to, when the disturbance more than the determination threshold is detected suppress the vehicle drive force until the disturbance becomes smaller than the determination threshold, and
the controller is configured to terminate the suppression of the vehicle drive force when the disturbance becomes smaller than the determination threshold.

* * * * *